US006029322A

United States Patent [19]

Belotti et al.

[11] Patent Number: 6,029,322

[45] Date of Patent: Feb. 29, 2000

[54] THEFT DETERRENT DEVICE

[75] Inventors: Oscar Belotti, Entratico, Italy; Albert Rave, Schoonebeek, Netherlands

[73] Assignee: Cross Point B.V., Emmen, Netherlands

[21] Appl. No.: 09/197,173

[22] Filed: Nov. 20, 1998

[30] Foreign Application Priority Data

Nov. 21, 1997 [EP] European Pat. Off. .............. 97203634

[51] Int. Cl.[7] ............................ E05B 51/00; E05B 73/00; F16B 21/00; G08B 13/00

[52] U.S. Cl. .......................... 24/704.1; 24/456; 24/704.2; 70/57.1

[58] Field of Search ............................... 24/704.1, 704.2, 24/456, 527; 70/57.1; 12/113

[56] References Cited

U.S. PATENT DOCUMENTS

| | | | |
|---|---|---|---|
| 2,749,588 | 6/1956 | Pliszczak et al. | 24/704.1 |
| 4,944,075 | 7/1990 | Hogan . | |
| 5,054,172 | 10/1991 | Hogan et al. . | |
| 5,205,024 | 4/1993 | Willard . | |
| 5,275,122 | 1/1994 | Stolz et al. . | |
| 5,293,674 | 3/1994 | Hendriks | 24/704.1 |
| 5,309,740 | 5/1994 | Hansen | 24/704.1 |
| 5,438,738 | 8/1995 | Stolz et al. . | |
| 5,680,681 | 10/1997 | Fuss . | |

FOREIGN PATENT DOCUMENTS

| | | | |
|---|---|---|---|
| 0404329 | 12/1990 | European Pat. Off. . | |
| 0 585 770 A1 | 3/1994 | European Pat. Off. . | |
| 0594324 | 4/1994 | European Pat. Off. . | |
| 0 573 426 B1 | 3/1996 | European Pat. Off. . | |
| 2450377 | 9/1980 | France | 24/704.1 |
| 3114028 | 11/1988 | Germany . | |
| 2075116 | 11/1981 | United Kingdom . | |
| WO 93/06582 | 4/1993 | WIPO . | |

*Primary Examiner*—Victor N. Sakran

*Attorney, Agent, or Firm*—Pearne, Gordon, McCoy & Granger LLP

[57] ABSTRACT

A device for deterring theft of an article, including a fragile vial containing a theft deterring substance; a vial carrier structure and a cover structure. The carrier structure includes a weakened region allowing the vial carrier to yield if a force is exerted on the attachment, thereby causing the vial to break due to loads transferred via vial engaging surfaces. The connection between the carrier structure and the cover structure is formed by two or more distinct local connections separated by a central area and located spaced away from the attachment in opposite longitudinal directions of the vial. The proposed device is of a simple cost-effective and light construction while the vial reliably fractures if an unauthorized attempt is made to remove the device.

10 Claims, 2 Drawing Sheets

THEFT DETERRENT DEVICE

BACKGROUND OF THE INVENTION

The present invention relates to a device for deterring theft, including a fragile elongate vial containing a theft deterring substance.

Such a device is known from EP-A-0 404 329 and can be connected to an article to be protected by connecting it to a further button or tag shaped device, a pin between the two devices extending through a portion of the article to be protected. Removal of the device is possible only by means of a special removal device. If the device is tampered with or if an attempt is made to pry the devices apart, one or more vials will fracture, allowing the theft deterrent substance to soiling the article to make it unusable. Such devices are used typically used in stores, where customers do not have access to the removal device in the store. After payment for an article the device will be removed by the store staff.

This known theft deterrent device includes a cover, a flexible member containing three fragile ink vials, a pin and a bottom part. Flexing of the flexible part leads to fracture of at least one of the vials. The flexible part comprises three weakened zones causing the flexible part to flex more easily in different predetermined directions. Three vials are each disposed within one of the weakened zones such that when the respective weakened zone is flexed, the vial is longitudinally flexed and fractures to thereby release the substance therein. Thus, the likelihood that at least one of the vials will fracture if an attempt is made to remove the theft deterrent device is made to a large extent independent of the direction in which the a moment of flexure is exerted onto the device.

However, use of multiple weakened zones and vials entails that the device is relatively large, heavy and costly. When the ink tags are attached to e.g. clothing made of delicate cloth like silk, the heavy construction of the ink tags causes damage to the article. Furthermore a large ink tag is disturbing and distracts the attention of a potential buyer from the qualities of the article to be presented.

SUMMARY OF THE INVENTION

It is an object of the present invention to provide a device for deterring theft of a protected article which is lighter, smaller and of a more simple and less costly construction while retaining the advantage that vials are reliably fractured essentially independent of the direction in which a moment of flexure is exerted onto the device.

According to the present invention, this object is achieved by providing a theft deterrent device including: a fragile elongate vial containing a theft deterring substance; a vial carrier structure including vial engaging surfaces in-between which the vial is being carried, an attachment means for attachment to an article to be protected at an attachment side of the device and a weakened region allowing the vial carrier to yield if a force in a direction towards the attachment side is exerted on the attachment means, thereby causing the vial to fracture due to loads transferred via the vial engaging surfaces; and a substantially rigid cover structure; the carrier structure being at least partially located within the cover structure and connected to the cover structure to restrain the carrier structure from movement away from the cover structure towards the attachment side; wherein the connection between the carrier structure and the cover structure is formed by at least two distinct local connections, the at least two distinct local connections being separated by a central area in which the carrier structure and the cover structure are not connected to each other and located spaced away from the attachment means in opposite longitudinal directions of the vial.

The carrier structure being covered by the cover structure, forces exerted onto the device will invariably be applied mainly onto the cover structure. These forces are transferred to the carrier structure via the distinct local connections spaced apart and spaced away from the attachment so that invariably a moment of flexure is exerted onto the carrier structure attempting to flex the carrier structure, and thereby the vial, in longitudinal direction and eventually causing the vial to break if the forces are of sufficient magnitude. Also in case of tampering, like attempts to pry apart the cover structure and carrier structure, forces applied will be transferred through the cover structure and the local connections to the carrier structure to break the vial.

The device according to the invention can be made very small in size, of an elongate narrow shape and light in weight, because it does not rely on a plurality of vials to achieve reliable fracturing of a vial in response to flexing in different directions. Furthermore, the device reliably releases the theft deterring substance in the event of unauthorized removal.

In accordance with a further aspect of the present invention the connections between the carrier structure and the cover structure are formed by click fingers mutually engaging upon insertion of the carrier structure in the cover structure. This has the advantages that it makes the device very easy to assemble, while ensuring a reliable connection to transfer force applied to the device to the carrier structure to break the vial.

The attachment means can advantageously be formed by a pin to be stuck through an article to be protected and to be attached to a clutch at the opposite side of the article.

Preferably, the pin includes a pinhead located between the carrier structure and the vial, so that the vial is also fractured if the device is forcibly pressed in the direction in which the pin projects, i.e. towards the other device at the opposite side of the portion of the article to be protected to which the device is attached.

Alternatively, the attachment means can be formed by a clutch for receiving and engaging a pin to be stuck through an article to be protected. This ensures that the device can easily be attached to another device including a pin. The other device can be provided in various forms such as in the form of a button, a tag or a loop with a pin-shaped end portions.

By locating the flexible region directly adjacent the attachment means, a compact construction of the device is made possible, and a large moment of flexure attempting is applied to the vial in longitudinal direction in response to a given force applied to the device.

Preferably, the device comprises a single vial only. This leads to a very compact and cost-effective construction.

By providing the cover structure with a weakened region adjacent to the weakened region of the carrier structure as well, an even more effective functioning of the device is obtained, as forces applied to the device during tampering with the cover structure or attempts to pry apart the cover structure and the carrier structure can additionally result in yielding and eventually breaking of the cover structure.

By providing that the vial engaging surfaces of the carrier structure define a channel having at least one entry for introduction of the vial in longitudinal direction, the at least one entry being closed off by the cover structure, mounting the fragile vial is made particularly simple, so that production costs are further reduced.

In order to provide a complete anti-theft facility, the device may also include a button or tag to be connected to the attachment means. The button or tag can for instance include an electronic article surveillance (EAS) device.

Further objects, features, advantages and details of the invention appear from the detailed description set forth below.

DETAILED DESCRIPTION

Figure 1:
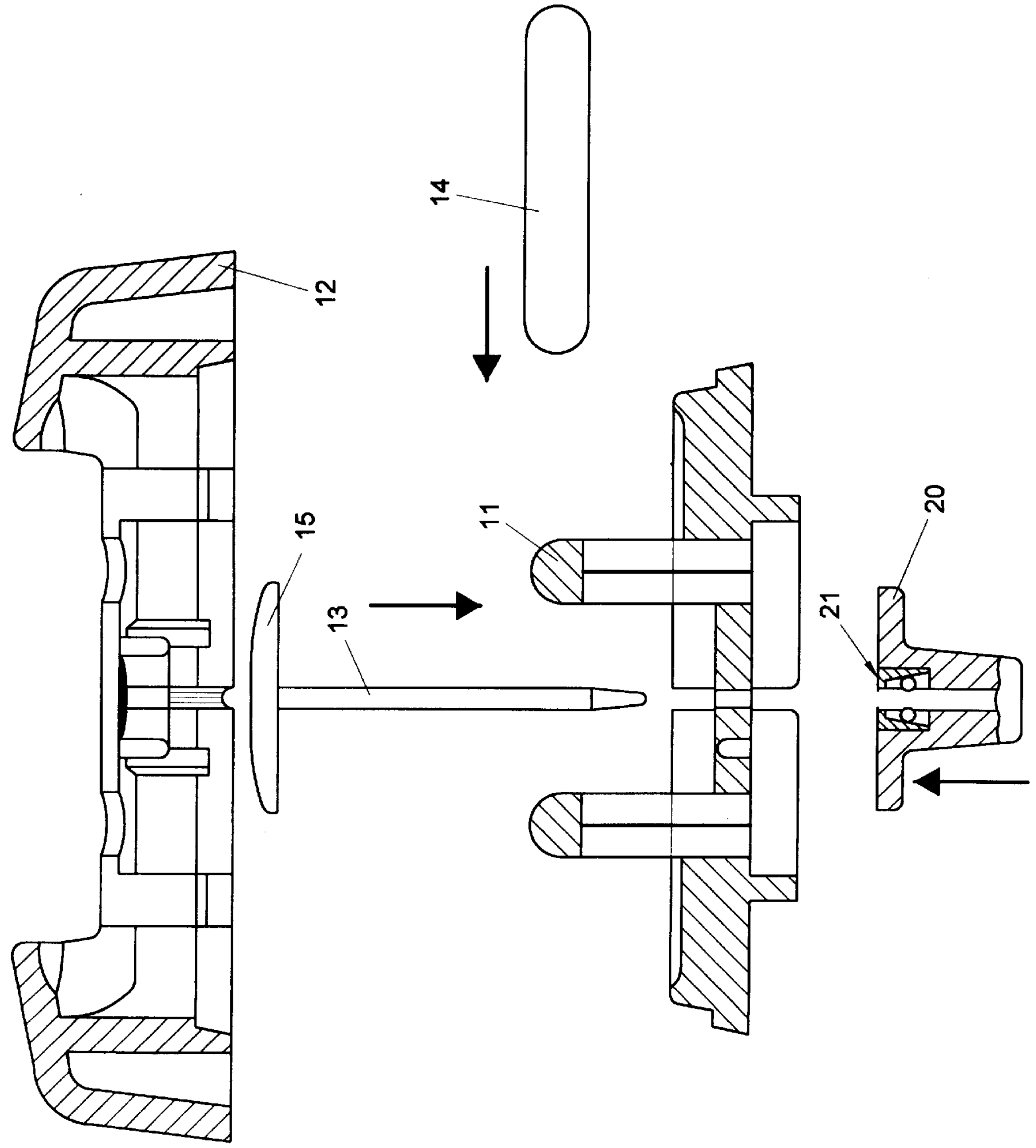
FIG. 1 is an exploded view of an example of a device according to the invention.
Figure 2:
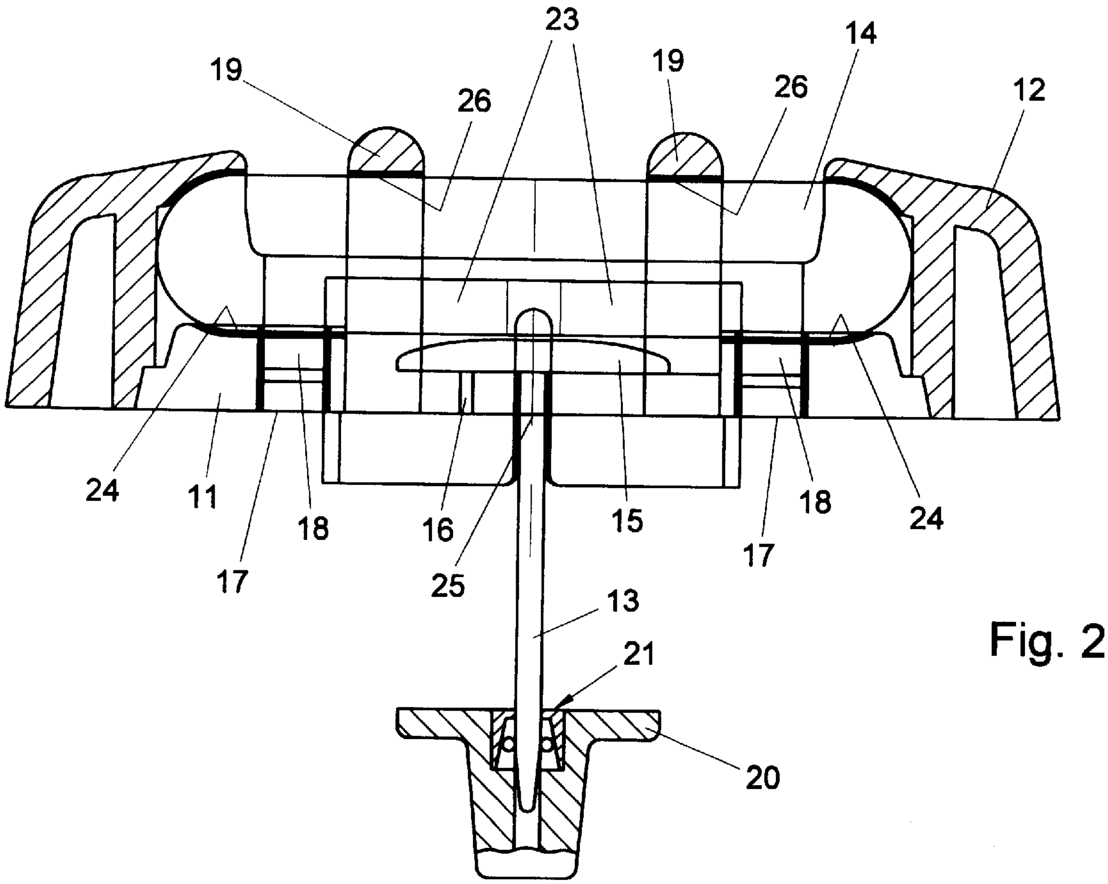
FIG. 2 is a side view of an assembled device according to the invention.
Figure 3:
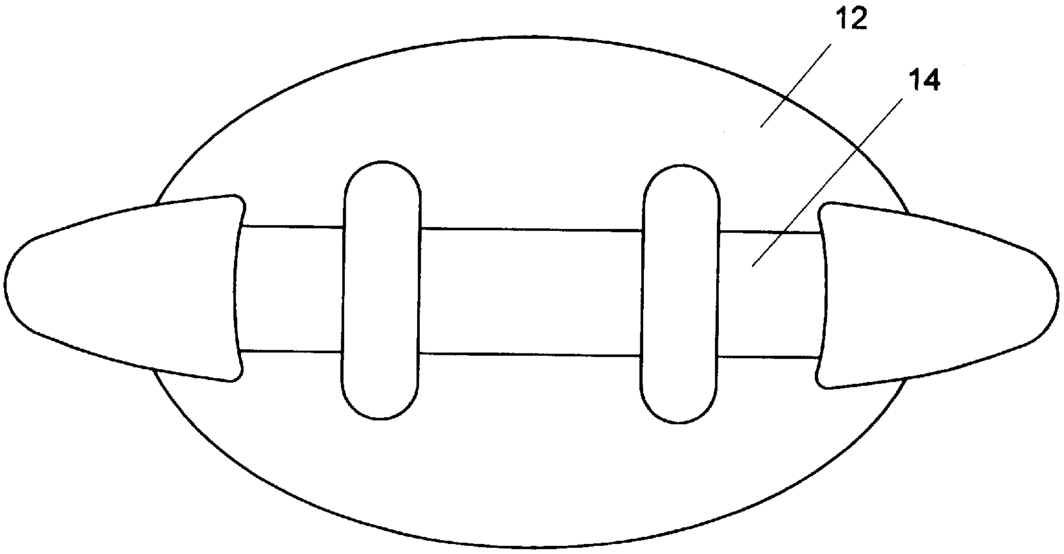
FIG. 3 is a plan view of an assembled device according to the invention.

The theft deterring device 10 shown in FIG. 1, which forms a presently most preferred embodiment of the invention, is composed of the following parts: a carrier structure 11, a fragile elongate vial 14, a cover structure 12 and a pin 13. A tag 20 with a clutch 21 can be provided mounted to the device or as a separate part to be connected to complete the device for attachment to an article to be protected. The pin 13 protrudes from the attachment side of the theft deterring device 10 and can be stuck through an article and into the clutch 21 of the tag 20 which clutch 21 in response engages the pin 13 to attach the tag 20 to the device 10. This clutch 21 can be opened by using a special opening device. Such opening devices are known as such and are generally provided with a large and strong magnet.

The pin 13 projects through an opening provided in the carrier structure 11 and the pinhead 15 rests in a recessed area on the carrier structure 11, so that the pinhead 15 is essentially level with the rest of surface of the carrier structure 11. The carrier structure 11 is provided with a weakened central region. In this embodiment it is implemented in such a way that the carrier structure 11 includes two sections that are connected by bridges 16. These bridges 16 are thin and therefore weak sections that allow the carrier structure 11 to bend easily in the weakened region.

The carrier structure 11 is further provided with openings 17 and ledges for receiving click fingers 18 of the cover structure 12 to make the connection between the cover structure 12 and the carrier structure 11.

During assembly of the device 10, first the pin 13 is inserted into the carrier structure. Then, the vial 14 is inserted into a channel of the carrier structure 11 which channel is formed between vial engagement surfaces 26 of two rims 19 and vial engagement surfaces 24 of a bottom portion of the carrier structure 11. Finally, the carrier structure 11 is clicked to the cover structure 12 which also covers the vial 14 to enclose the vial in its longitudinal direction.

The vial 14 is made of a fragile material, and it breaks easily under application of a longitudinal bending moment. The vial is filled with a theft deterrent substance (in this case a detrimental substance that soils and marks the article when released). It is noted that many other types of substance can be used such as for instance ill smelling or fume generating or itching substances in gas, liquid or powder form. Preferably the vial 14 is made of a transparent or translucent material so that the condition of the detrimental substance can be inspected, and that the public is made aware of the presence of its contents.

The vial 14 is kept in position in the channel on the carrier structure 11 by means of the cover structure 12 when mounted. The cover structure 12 is also provided with ridges 23 that press the pinhead 15 down onto the carrier structure 11, so that the top surface of the pinhead 15 is normally spaced from the vial 14.

In use, the device operates as follows. Attempts to remove the theft deterring device by force and in particular pulling in a direction opposite to the direction in which the pin 13 projects, will lead to the application of loads to the device 10 which cause reactive loads in the pin 13 which the pinhead 15 transfers to the carrier structure 11. The loads applied to the device 10 are primarily introduced via the cover structure 12 and transferred to the carrier structure 11 via the fingers 18.

The portions of the carrier structure 11 between the weakened central region 16 and the connections 18 between the cover structure 12 and the carrier structure 11 near the end sections of the vial 14 form levers which upon application of the described loads introduce a substantial moment of flexure into the weakened region 16. This cause the weakened region to flex or even break. The rims 19 and the vial engaging surfaces 24 of the carrier structure 11 transfer the moment of flexure applied to the carrier structure 11 to the vial 14 which, in turn, causes the vial to fracture if a given limit is exceeded. Consequently, the detrimental substance is released.

Since the distance between the rims 19 and the connection 18 at the respective sides of the pin 13 is smaller than the distance between the pin 13 and the respective connection, loads exerted by the pin 13 are levered to larger loads exerted by the rims onto the vial 14 so that crushing of the vial 14 is facilitated. Moreover, the distance in longitudinal direction between the rims 19 and the engaging surfaces 24 of the carrier structure 11 at the respective side of the pin 13 is about equal to the distance between the pin 13 and each of the rims 19, so that the increased normal force exerted by the rims 19 also results in an increased moment of flexure applied to the vial 14.

In the event of an attempt to pry apart the cover structure 12 and the carrier structure 11, for instance using pliers, the force exerted on the rigid cover structure 12 is transferred to the carrier structure 11 as well, and causes a bending moment exerted on the vial 14 in the same way as described above.

The rigid cover structure 12 is provided with weakened regions 25 which, in mounted position, are in line with the weakened region of the carrier structure 11. These weakened regions cause stress concentrations in the cover structure 12 and therefore facilitate the bending, and eventually breaking of the rigid cover, to facilitate the breaking of the vial 14 even further.

The device can be made of many materials. However, polymers like ABS and PS that are relatively stiff and can be made to have an attractive, smooth appearance are preferred.

Although the invention has been described in detail with reference to a preferred embodiment, from the foregoing it will readily become apparent to those skilled in the art that many and varied changes can be made without departing from the spirit and scope of the invention.

What is claimed is:

1. A device for deterring theft of an article, comprising:

a fragile elongate vial containing a theft deterring substance, said vial having a central portion and being elongate in a longitudinal direction;

a vial carrier structure including vial engaging surfaces in-between which said vial is being carried, an attachment means for attachment to an article to be protected at an attachment side of said device and a weakened region allowing the vial carrier to yield if a force in a direction towards said attachment side is exerted on said attachment means, thereby causing the vial to fracture due to loads transferred via said vial engaging surfaces; and a substantially rigid cover structure;

said weakened region providing said vial carrier structure with a flexible central portion;

said vial engaging surfaces including a first vial engaging surface and a second vial engaging surface, both of said first and second vial engaging surfaces being adjacent the same side of said vial, both of said first and second vial engaging surfaces being spaced apart from said central portion of said vial for engaging said vial to break said vial in response to flexing of the central portion of the vial carrier structure;

said carrier structure being at least partially located within said cover structure and connected to said cover structure to restrain the carrier structure from movement away from said cover structure towards said attachment side;

wherein said connection between said carrier structure and said cover structure is formed by at least two distinct local connections, said at least two distinct local connections being separated by a central area in which said carrier structure and said cover structure are not connected to each other and located spaced away from said attachment means in opposite longitudinal directions of said vial.

2. A device according to claim 1, wherein said connections are formed by click fingers mutually engaging upon insertion of said carrier structure in said cover structure.

3. A device according to claim 1, wherein said attachment means are formed by a pin to be stuck through an article to be protected.

4. A device according to claim 3, wherein the pin includes a pinhead located between the carrier structure and the vial.

5. A device according to claim 1, wherein said attachment means are formed by a clutch for receiving and engaging a pin to be stuck through an article to be protected.

6. A device according to claim 1, wherein said weakened region is located directly adjacent said attachment means.

7. A device according to claim 1, comprising a single vial only.

8. A device according to claim 1, wherein the cover structure is provided with a weakened region adjacent to said weakened region of said carrier structure.

9. A device according to claim 1, wherein the vial engaging surfaces of said carrier structure define a channel having at least one entry for introduction of said vial in longitudinal direction, said at least one entry being closed off by said cover structure.

10. A device according to claim 1, further comprising a button or tag to be connected to said attachment means.

* * * * *